United States Patent Office 3,190,832
Patented June 22, 1965

3,190,832
FULL OIL PHASE DRILLING FLUIDS
Joseph U. Messenger, Calgary, Alberta, Canada, assignor to Socony Mobil Oil Company, Inc., a corporation of New York
No Drawing. Filed May 18, 1961, Ser. No. 110,902
14 Claims. (Cl. 252—8.5)

This invention relates to drilling fluids and relates more particularly to full oil phase drilling fluids.

In the rotary drilling of wells, such as those for petroleum oil or gas, a drilling fluid is circulated from the surface of the ground to the bottom of the well borehole and back to the surface of the ground. The drilling fluid has various functions including those of lubricating the drill bit and pipe, carrying cuttings from the bottom of the well borehole to the surface of the ground, and imposing a hydrostatic head on the drilled formations to prevent escape of oil, gas, or water therefrom into the well borehole during the drilling operations. Ordinarily, aqueous drilling fluids comprising a suspension of a clay in a continuous water phase are employed. However, aqueous drilling fluids are sensitive to high temperatures and contamination by salt and cement encountered during the drilling operations. Further, aqueous drilling fluids have a comparatively high specific gravity and are recognized to damage oil-producing formations by reason of filtration of water and suspended solid particles from the fluid into the formations. Full oil phase drilling fluids are less subject to these difficulties and thus they are employed in many instances where aqueous drilling fluids would not be satisfactory.

Drilling fluids must have satisfactory gel-strength properties in order to suspend solid particles. Additionally, they must have satisfactory filter-loss and surge-loss properties in order to prevent appreciable flow of fluid, with consequent loss of the fluid along with suspended solid particles, into permeable formations encountered during drilling. Oils alone do not possess these properties in sufficient degree to make their use ordinarily satisfactory. Treatment of petroleum oil with various plastering and dispersing agents has been proposed to impart or to improve these properties. Further, petroleum oil has been subjected to treatment with sulphuric acid followed by neutralization to prepare it for use as a drilling fluid. However, while petroleum oil in a full oil phase drilling fluid is desirable from the standpoint of economy and availability, the gel-strength, filter-loss, and surge-loss properties obtained by the treating procedures heretofore employed have been susceptible to improvement.

It is an object of this invention to provide a full oil phase drilling fluid. It is another object of this invention to provide a method for the treatment of petroleum oil to render it suitable for use in a full oil phase drilling fluid. It is another object of this invention to increase the gel-strength of a full oil phase drilling fluid prepared from petroleum oil. It is another object of this invention to decrease the filter and surge losses of a full oil phase drilling fluid prepared from petroleum oil. These and other objects of the invention will become apparent from the following detailed description.

In accordance with the invention, there is provided a full oil phase drilling fluid which comprises in predominant amount petroleum oil containing the reaction products of an asphaltene constituent of petroleum oil, a sulphonating agent for the asphaltene constituent, and a silicate or an aluminate of an alkali metal.

By "full oil phase" drilling fluid is meant a drilling fluid in which the liquid phase consists entirely of oil or consists of oil containing only a minor amount of emulsified water, i.e., water in the dispersed phase. Water can be a constituent of a drilling fluid, which otherwise would have a liquid phase consisting entirely of oil, by virtue of intentional addition of the water. Water can also be a constituent of such a drilling fluid by virtue of unintentional addition of water. Unintentional addition of water can occur as the result of rain entering pits or open vessels containing the drilling fluid and as the result of flow of water from a subterranean formation into the well borehole containing the fluid. The amount of emulsified water in a full oil phase drilling fluid preferably should not exceed 4 percent by volume of the liquid phase of the fluid. More preferably, the amount of emulsified water should be less than 4 percent by volume. It is particularly preferred that the amount of emulsified water not exceed 2 percent by volume of the liquid phase of the fluid.

The drilling fluid of the invention can be prepared by a procedure involving as its first step sulphonation of petroleum oil. The petroleum oil employed for the sulphonation step is any petroleum oil capable of being sulphonated. Petroleum oils capable of being sulphonated include crude petroleum oil containing an asphaltene as a constituent. These petroleum oils are usually described as being asphaltic petroleum oils and have carbon residues between 5 and 11 percent by weight. The petroleum oil may also be a refined petroleum oil containing an asphaltent constituent. Preferably, however, crude petroleum oil is employed.

The petroleum oil employed for the sulphonation step may be a single petroleum oil or a mixture of petroleum oils. Where a mixture is employed, each of the individual petroleum oils may be asphaltic. On the other hand, where a mixture of petroleum oils are employed, one or more of the individual petroleum oils may be paraffinic. For example, a low gravity high carbon residue asphaltic crude petroleum oil can be diluted with low carbon residue paraffinic crude petroleum oil. An advantage resides in such a mixture in that control of viscosity is effected.

Sulphonation of the petroleum oil is effected employing any sulphonating agent. A satisfactory sulphonating agent is sulphuric acid. The sulphuric acid should be in the form commonly known as concentrated sulphuric acid. Sulphuric acid is the reaction product of sulphur trioxide and water. In the presence of an excess of water, a water solution of hydrogen sulphate is formed. The concentration of the hydrogen sulphate, i.e., the concentration of the acid solution, may be expressed in terms of the sulphur trioxide content of the solution. However, concentration is more commonly expressed on the basis of the relative weight of the sulphuric acid and the relative weight may be in terms of density, specific gravity, or degrees Baumé. Any of the commercial concentrated acids may be employed. Effective results have been obtained with commercial sulphuric acid having a specific gravity of about 1.8 or 66° Baumé. The form of sulphuric acid known as oleum, or fuming sulphuric acid, may also be employed. Included among other sulphonating agents which may be employed for sulphonating the petroleum oil is sulphur trioxide per se.

The proportion of sulphonating agent to petroleum oil employed in the sulphonation step may vary within limits. Generally, the proportion of sulphonating agent to petroleum oil should be such that the amount of available sulphur trioxide in the sulphonating agent is 1.8 to 6.0 pounds per barrel of petroleum oil. By "barrel" is meant a 42-gallon barrel. Less than 1.8 and more than 6.0 pounds of sulphur trioxide per barrel of petroleum oil can also be employed, if desired. Where sulphuric acid having a specific gravity of about 1.8, or 66° Baumé, is employed, the amount of sulphuric acid may be between about 2.4 and 8.0 pounds per barrel of petroleum oil.

The rate of the sulphonation reaction depends upon the temperature at which the reaction is carried out. Thus, the time during which the sulphonation reaction is permitted to occur will depend upon the temperature of the reaction mixture. In many instances, to which reference will be made again hereinafter, the sulphonation reaction will be carried out under circumstances where the temperature of the sulphonation reaction mixture will be largely dependent upon atmospheric conditions. In cold climates, during the winter period, atmospheric conditions can often be such that the temperature of the reaction mixture will be much below 32° F., the freezing point of water. For example, the temperature may be below 0° F. Under such temperature conditions, the time of the sulphonation reaction should be at least as great as two hours. Preferably, however, the sulphonation reaction is carried out at a temperature at least as high as 60° F. At temperatures of the order of 60° F., the reaction time should be about one hour. At temperatures above 60° F., the reaction time may be reduced. Artificial heating may be employed to raise the temperature of the sulphonation reaction mixture. Thus, the temperature at which the sulphonation reaction is carried out may be as high as desired within practical limits. The temperature may be as high as 120° F., for example. However, temperatures sufficiently high to tend to produce sulphation, as contrasted with sulphonation, and to create undue fire hazard resulting from flashing of the petroleum oil are to be avoided. Generally, regardless of the temperature at which the sulphonation reaction is carried out, the time during which the reaction is permitted to occur should be at least as great as one hour.

During the sulphonation reaction, it is desirable to agitate the reaction mixture. This is particularly true where sulphuric acid is employed as the sulphonating agent. Sulphuric acid is more dense than petroleum oil and tends to settle to the bottom of the body of petroleum oil with which it is admixed. Settling, or other localized concentrating of the sulphuric acid, can result in charring of a portion of the petroleum oil. Agitation will prevent such charring. Further, agitation can effect a more rapid completion of the sulphonation reaction.

In the preparation of the drilling fluid of the invention, a second step of the procedure involves reacting the sulphonated petroleum oil with a silicate or an aluminate of an alkali metal. The silicate or aluminate of an alkali metal will react with the sulphonated petroleum oil to neutralize the sulphonated petroleum oil and to form the oxide of silicon or aluminum, respectively, within the reaction mixture. Neutralization of the sulphonated petroleum oil is desirable from the standpoint of minimizing or eliminating corrosive effects of the drilling fluid. Further, neutralization is important from the standpoint of increasing the plastic viscosity of the drilling fluid. However, reaction of the sulphonated petroleum oil with the silicate or aluminate of the alkali metal is essential from the standpoint of imparting to the drilling fluid satisfactorily low filter and surge losses. The alkali metal silicate, or aluminate, reacting with the sulphonated petroleum oil within the reaction mixture, i.e., in situ, forms water, the alkali metal sulphonate, and silica or alumina, respectively. The silica or alumina formed in situ is colloidal and the small particles of the colloidal silica or alumina within the drilling fluid acts as a filter-loss and surge-loss agent. Neutralization alone of the sulphonated petroleum oil also improves to a degree the surge loss of the drilling fluid. However, the improvement in the surge loss obtained by neutralization of the sulphonated petroleum oil is of minor degree relative to the reduction in surge loss effected by the colloidal silica or alumina formed in situ. Thus, the second step in the preparation of the drilling fluid is essential from the standpoint of imparting to the drilling fluid the requisite values of the filter loss and surge loss. In this second step, both a silicate and an aluminate of an alkali metal may be employed.

The amount of silicate or aluminate of the alkali metal to be added to the sulphonated petroleum oil should be at least one-half that required to react stoichiometrically with the acid sulphonate. Greater amounts, of course, can be employed. For example, the amount of silicate or aluminate of the alkali metal added to the sulphonated petroleum oil may be that required to react stoichiometrically with the acid sulphonate. However, the improvement in the properties of the drilling fluid attained with amounts of the silicate or aluminate of the alkali metal greater than the stoichiometric amount does not warrant the use of the greater amounts. In any event, an amount of alkali metal silicate or aluminate should be employed such that the amount of silica or alumina in the finished drilling fluid is at least one pound per barrel.

The silicates or aluminates of any of the alkali metals may be used. Preferably, the sodium silicate and the sodium aluminate are used. However, the potassium silicate and aluminate may also be used. The silicates and aluminates of lithium, rubidium, and cesium may be used but the relatively high cost of these compounds would ordinarily make their use impracticable. Sodium silicate is obtainable commercially in the form of aqueous solutions. The concentrations of the silicate in the aqueous solutions can be expressed on the basis of the relative weight of the solutions and the relative weight may be in terms of density, specific gravity, or degrees Baumé. Additionally, commercial solutions of sodium silicate vary in the proportion of sodium oxide to silicon dioxide. Variations in the proportions of the sodium oxide to the silicon dioxide do not materially affect the properties of the drilling fluid and, thus, from the standpoint of drilling fluid properties, these commercial solutions are satisfactory. However, where a commercial solution of sodium silicate is employed, the amount employed should be based upon the amount of sodium oxide, $Na_2O$, contained in the solution.

Where aqueous solutions of silicate or aluminate of the alkali metal are employed, a solution of such concentration should be employed that the amount of emulsified water in the drilling fluid will not exceed 4 percent by volume.

The rate of the reaction between the sulphonated petroleum oil and the silicate or aluminate of the alkali metal also depends upon the temperature at which the reaction is carried out. This temperature at which this reaction is carried out, similar to the temperature at which the sulphonation reaction is carried out, may be limited by atmospheric conditions. Additionally, this temperature at which the reaction between the sulphonated petroleum oil and the silicate or aluminate of the alkali metal is carried out will effect the particle size of the colloidal silica or alumina formed in situ. With reaction conditions otherwise being the same, the colloidal silica or alumina formed in situ will have a smaller particle size at lower temperatures of reaction than at higher temperatures. The particle size of the colloidal silica or alumina, as well as the total amounts thereof, affects the filter loss and surge loss of the drilling fluid, with larger particles reducing the filter loss and surge loss to a greater degree than smaller particles. Thus, the filter loss and the surge loss of the drilling fluid are affected by the temperature at which the reaction is carried out. Accordingly, to obtain a decreased filter loss, the reaction is carried out at higher temperatures. It is preferred to carry out the reaction at temperatures of 115° to 120° F.

Agitation of the reaction mixture during the second step of the reaction is also desirable. Where sodium silicate solution, for example, is employed, the solution tends to sink to the bottom of the reaction mixture. Agitation reduces such sinking and thus reduces the time for completion of the reaction. Further, agitation will more rapidly distribute throughout the reaction mixture the colloidal silica or alumina formed in situ.

Neutralization of sulphonated petroleum oil with the silicate or aluminate of the alkali metal results in the formation, as a reaction product, of the alkali metal salt of the sulphonated petroleum oil. It is preferred, from the standpoint of the rheological properties of the drilling fluid, that the alkali metal salt of the sulphonated petroleum oil be converted to a divalent metal salt. Thus, it is preferred that the reaction mixture, subsequent to the formation of the alkali metal sulphonate, be subjected to an ion exchange reaction. The divalent metal ion to be substituted for the alkali metal ion of the salt of the acid sulphonate may be any divalent ion. Preferably, however, the divalent metal ion is alkaline-earth metal ion. Thus, for the ion exchange reaction, a salt, oxide, or hydroxide of any alkaline-earth metal may be employed. These may be the salts, oxide, or hydroxide of calcium, barium, magnesium, or strontium. Preferably, however, a calcium salt, oxide, or hydroxide is employed. Of these, calcium hydroxide, or slaked lime, is preferred. The amount of divalent metal compound employed for the ion exchange reaction can be the stoichiometric amount. However, lesser amounts may also be employed.

The ion exchange reaction can be carried out under temperature conditions which are selected taking into consideration the same factors as those relating to the sulphonation reaction and the reaction between the sulphonated petroleum oil and the silicate or aluminate of the alkali metal. The same is true with respect to conditions of agitation. Concerning temperature, the ion exchange reaction can be carried out satisfactorily between 115° and 120° F.

Reaction of the sulphonated petroleum oil with the silicate or aluminate of the alkali metal, as indicated, results in neutralization of the acid sulphonate. Where the amount of silicate or aluminate of the alkali metal employed is less than the stoichiometric amount, some acid sulphonate will not be neutralized. It is preferred, for the reasons given hereinabove, that the sulphonated petroleum oil be neutralized. Neutralization of excess acid sulphonate can be effected concomitantly with ion exchange. Thus, for the ion exchange reaction, where the divalent metal compound employed is basic, as for example, where the oxide or hydroxide is employed, an amount in excess of that required for ion exchange can be employed. The amount employed in this case will be the amount required to effect ion exchange as well as neutralization of acid sulphonate, i.e., an amount equivalent to the amount of sulphuric acid employed in the sulphonation reaction. In any case, following ion exchange, if acid sulphonate is present, neutralization is effected and any basic compound may be employed for this purpose. Sodium hydroxide, for example, may be employed.

The divalent metal salt of sulphonated petroleum oil is capable, to an extent, of ion exchange with silicon ion and aluminum ion in the reaction mixture. It is also capable of ion exchange, to an extent, with alkali metal ion in the reaction mixture. As a result, an equilibrium is established within the reaction mixture between the various ion exchange products. Thus, the full oil phase drilling fluid will contain, in equilibrium with each other, monovalent metal petroleum sulphonate, such as sodium petroleum sulphonate; divalent metal petroleum sulphonate, such as calcium petroleum sulphonate; trivalent metal petroleum sulphonate, such as aluminum petroleum sulphonate; and tetravalent metal petroleum sulphonate, such as silicon petroleum sulphonate. These metal petroleum sulphonates may be regarded as polymers of petroleum sulphonate. Containing one, two, three, or four molecules of petroleum sulphonate, respectively, each of the molecules of metal sulphonate will be of a different size. Since these molecules are of different size, they act to impart favorable properties of viscosity, gel strength, filter loss, and surge loss to the drilling fluid.

The reaction products obtained subsequent to the reaction between the sulphonated petroleum oil and the silicate or aluminate of the alkali metal, or subsequent to the ion exchange reaction where the ion exchange reaction is employed, may be used as the entire liquid portion of the full oil phase drilling fluid. On the other hand, the reaction products may be employed as part of the liquid phase of the drilling fluid. In this latter case, oil is added to the reaction products to provide the remainder of the liquid phase. This oil may be a crude petroleum oil, a diesel oil, or other type of oil. This oil, additionally, may be asphaltic or paraffinic. Further, this oil, if asphaltic, may have been subjected to a sulphonation treatment. Moreover, where the reaction product has been subjected to the ion exchange reaction prior to admixture with additional oil, this additional oil, if asphaltic, may also have been subjected, along with sulphonation, to treatment with a silicate or aluminate of an alkali metal. Further, where additional oil is added to the reaction product, this additional oil, whether asphaltic or paraffinic, may contain a divalent metal compound. In such instances, the ion exchange reaction can be effected as a result of admixture of additional oil with the reaction product. The additional oil may also be a previously prepared, and used, full oil phase drilling fluid.

Where the reaction products are employed as part only of the liquid phase of the drilling fluid, the petroleum oil prior to the sulphonation reaction may be treated to concentrate its asphaltic portion. Thus, the petroleum oil may be subjected to extraction to remove the asphaltic portion. The removed asphaltic portion is then sulphonated to yield a solid reaction product. The solid reaction product is then mixed with a paraffinic or asphaltic petroleum oil for preparation of the drilling fluid.

The full oil phase drilling fluid may contain components additional to the reaction products of the sulphonated petroleum oil and the silicate or aluminate of the alkali metal and the products of ion exchange, where ion exchange is employed. Thus, for example, the drilling fluid may contain clays such as bentonite. The effect of clays will be to increase the viscosity and yield value of the drilling fluid and, to some extent, additionally reduce filter loss. Clays will also increase to some extent the gel strengths of the drilling fluid. Further, the full oil phase drilling fluid may contain weighting agents such as barites. Caustic may also be employed in the full oil phase drilling fluid for the purpose of further reducing filter loss if such is necessary. An emulsifying agent may also be added to the drilling fluid. The emulsifying agent will assist in emulsification of any water contained in the drilling fluid. The emulsifying agent will also effect improvement in the rheological properties of the drilling fluid. Any type of emulsifying agent may be employed. Preferably, however, oxidized tall oil is employed.

The drilling fluid of the invention may be prepared at a central point and thereafter transported to the drilling site where it is to be used. Additionally, the reaction product may be prepared at a central point and thereafter transported to the drilling site and, at the drilling site, additional oil, such as oil phase drilling fluid, added to it. However, the invention is particularly adapted for preparation of the drilling fluid entirely at the drilling site. Thus, the reactions of sulphonation, neutralization of the sulphonated petroleum oil with the silicate or aluminate of the alkali metal, and the ion exchange reaction, where employed, may be carried out at the drilling site. Under such circumstances, atmospheric conditions of temperature will affect the temperature at which the reactions are carried out. Thus, heating of the reaction mixture may be employed where atmospheric temperatures are sufficiently low to interfere with effective reaction. Effective heating can be obtained by passage of steam through pipes, or coils, and transfer of heat therefrom to the reaction mixture.

The following examples will be illustrative of the invention:

EXAMPLE 1

A full oil phase drilling fluid was prepared from a mixture of crude petroleum oils by the following procedure.

To a mixture of 233 volumes of Glenevis crude petroleum oil and 117 volumes of Whitecourt petroleum oil there were added 6.2 pounds per barrel of sulphuric acid having a gravity of 66° Baumé. The resulting reaction mixture was stirred for one hour at a temperature of 74° F. At the end of this period of stirring, eight volumes of sodium silicate solution were added to the reaction mixture. The reaction mixture was then stirred for an hour at 120° F. The sodium silicate solution had a gravity of 41° Baumé and a mol ratio of $SiO_2$ to $Na_2O$ of 3.36. Thereafter there were added to the mixture lime in the amount of 10.3 pounds per barrel, bentonite in the amount of 8.6 pounds per barrel, and barite in the amount of 43 pounds per barrel. There were also added ten volumes of water. The mixture was stirred to distribute uniformly the added material throughout the mixture.

Following stirring, the surge loss and the filter loss of the resulting drilling fluid were measured. For these measurements, the standard procedure of the American Petroleum Institute for measuring surge loss and filter loss at high temperatures and high pressures was employed. The pressure and temperature at which the surge loss and filter loss of the drilling fluid were measured was 750 pounds per square inch and 180° F., respectively. The surge loss and the 30-minute filter loss were both zero.

EXAMPLE 2

In this example, another full oil phase drilling fluid was prepared from a mixture of petroleum crude oils. This drilling fluid was prepared by the following procedure.

To 175 volumes of Glenevis crude petroleum oil and 175 volumes of Whitecourt crude petroleum oil was added 6.2 pounds per barrel of sulphuric acid having a gravity of 66° Baumé. The mixture was agitated for one hour at a temperature of 35° F. Thereafter, there were added to the mixture nine volumes of sodium silicate solution having a gravity of 41° Baumé and a mol ratio of $SiO_2$ to $Na_2O$ of 3.36. The mixture was heated to a temperature of 120° F. prior to adding the sodium silicate and was stirred for a period of one hour at this temperature. Thereafter, lime in the amount of 12 pounds per barrel of the mixture was added with stirring.

Following stirring, the filter loss of the resulting drilling fluid was measured. The procedure employed for measuring the filter loss was the ordinary American Petroleum Institute procedure. The measurement was carried out at 90° F. and 100 pounds per square inch pressure and the 30-minute filter loss was zero. The plastic viscosity, yield strength, and initial and 10-minute gel strengths of the drilling fluid were also measured. The plastic viscosity was 54 centipoises, the yield value was 6 pounds per 100 square feet, and the initial gel strength was 1.5 pounds per 100 square feet and the 10-minute gel strength was 2 pounds per 100 square feet.

EXAMPLE 3

In this example, another full oil phase drilling fluid was prepared from a mixture of petroleum crude oils.

To 583 volumes of Coleville petroleum crude oil and 1,167 volumes of Gleneath petroleum crude oil there were added 6.5 pounds per barrel of sulphuric acid having a gravity of 66° Baumé. The mixture was stirred for one hour at a temperature of 0° F. Thereafter, the mixture was heated to 117° F. and there were added 42½ volumes of sodium silicate solution having a gravity of 41° Baumé and a mol ratio of $SiO_2$ to $Na_2O$ of 3.36. The mixture was stirred for 10 minutes. Thereafter, lime in the amount of 7.2 pounds per barrel and barites in the amount of 92 pounds per barrel were added to the mixture and the mixture was stirred for 15 minutes after each addition. Thereafter, oxidized tall oil was added in the amount of 1.1 pounds per barrel and the mixture was stirred for another 10 minutes.

The properties of the drilling fluid thus prepared were then measured. Filter loss was measured by the standard American Petroleum Institute procedure. These properties are set forth in the following table.

*Table I*

| | |
|---|---|
| Weight, lbs./gal. | 10.2 |
| Funnel viscosity, at 90° F. | 105 |
| API filter loss at 235° F. and 700 pounds per square inch, cc. in 30 min. | 2.8 |
| Apparent viscosity, cps. at 90° F. | 85 |
| Plastic viscosity, cps. at 90° F. | 80 |
| Yield point, lbs./100 sq. ft. at 90° F. | 10 |
| Initial gel strength, lbs./100 sq. ft. | 5 |
| 10-minute gel strength, lbs./100 sq. ft. | 7 |
| Oil, volume percent | 79 |
| Solids, volume percent | 20 |
| Water, volume percent | 1 |

EXAMPLE 4

This example further illustrates the preparation of a full oil phase drilling fluid from a mixture of petroleum crude oils.

Whitecourt petroleum crude oil and Glenevis petroleum crude oil in the amount of 200 volumes and 150 volumes, respectively, were mixed with 6.5 pounds per barrel of sulphuric acid having a gravity of 66° Baumé. The mixture was stirred for a period of one hour at a temperature of 76° F. Thereafter, there were added to the mixture at 115° F. 13 volumes of 30 weight percent solution in water of sodium aluminate. The mixture was stirred at a temperature of 115° F. for one hour and there were thereafter added 12 pounds per barrel of lime and 100 pounds per barrel of barites. Thereafter, the properties of the resulting drilling fluid were measured. Surge loss and filter loss were measured by the American Petroleum Institute procedure. The properties are given in the following table.

*Table II*

| | |
|---|---|
| API filter loss, cc. in 30 min. at 110° F. | 0 |
| Plastic viscosity, cps. | 66 |
| Yield value, lbs./100 sq. ft. | 3 |
| Initial gel strength, lbs./100 sq. ft. | 1 |
| 10-minute gel strength, lbs./100 sq. ft. | 2 |
| API filter loss, cc. at 600 lbs./sq. inch at 200° F. | 0.8 |
| Surge loss | 0 |

EXAMPLE 5

In this example, a full oil phase drilling fluid was prepared employing two petroleum crude oils and a refined petroleum oil.

A mixture containing 560 volumes of Boundary Lake petroleum crude oil, 160 volumes of Bunker C oil, and 80 volumes of Glenevis petroleum crude oil was mixed with 6.4 pounds per barrel of sulphuric acid having a gravity of 66° Baumé. The temperature of the mixture during reaction of the sulphuric acid varied between 60° and 120° F. Thereafter, there were added to the mixture 12 pounds per barrel of aqueous sodium silicate solution having a gravity of 41° Baumé and a mol ratio of $SiO_2$ to $Na_2O$ of 3.36. The temperature during reaction of the sodium silicate solution varied between 110° and 120° F. There were then added to the mixture 12 pounds per barrel of lime, 5 pounds per barrel of bentonite, 80 pounds per barrel of barites, and 5.5 pounds per barrel of oxidized tall oil. The resulting drilling fluid had the following properties:

Table III

| | |
|---|---|
| Mud density, lbs./gal. | 9.6 |
| API funnel viscosity, sec. | 110 |
| Plastic viscosity, cps. | 93 |
| Yield point, lbs./100 sq. ft. | 9 |
| Initial gel strength, lbs./100 sq. ft. | 1 |
| 10-minute gel strength, lbs./100 sq. ft. | 2 |
| API filter loss, cc. in 30 min. | 0 |

The filter loss was measured by the standard procedure of the American Petroleum Institute.

EXAMPLE 6

In this example, a single petroleum crude oil was employed. Sulphuric acid in the amount of 5.7 pounds per barrel was added to Ingoldsby medium petroleum crude oil. Sodium silicate was then mixed with the sulphonated crude oil at 110°–120° F. in the amount of 11.2 pounds per barrel. This sodium silicate solution had a gravity of 41° Baumé and a mol ratio of $SiO_2$ to $Na_2O$ of 3.36. There were thereafter added to the mixture 11 pounds per barrel of lime, 0.7 pound per barrel of sodium hydroxide, 85 pounds per barrel of barites, 3.8 pounds per barrel of bentonite, and 1.9 pounds per barrel of oxidized tall oil. The resulting drilling fluid contained 2 volume percent of water. The properties of this drilling fluid were measured and were as follows:

Table IV

| | |
|---|---|
| Weight, lbs./gal. | 9.9 |
| Funnel viscosity, sec. | 70 |
| API filter loss, cc. at 300 lbs./sq. inch at 125° F. | 0 |

Having thus described my invention, it will be understood that such description has been given by way of illustration and example and not by way of limitation, reference for the latter purpose being had to the appended claims.

I claim:

1. A full oil phase drilling fluid comprising a predominant amount of petroleum oil, which oil contains an asphaltene constituent and has a carbon residue of at least 5 percent by weight, and the reaction products formed by the addition to said oil of a sulphonating agent for said asphaltene constituent of said oil in an amount equivalent to between about 1.8 and 6.0 pounds of available sulphur trioxide per barrel of said oil and by the addition thereafter to said oil of a compound selected from the group consisting of a silicate and an aluminate of an alkali metal in an amount of at least half that required to react stoichiometrically with the reaction product of said asphaltene constituent with said sulphonating agent, said drilling fluid containing not more than 4 percent by weight of water.

2. The drilling fluid of claim 1 wherein said sulphonating agent is concentrated sulphuric acid.

3. A full oil phase drilling fluid comprising a predominant amount of petroleum oil, which oil contains an asphaltene constituent and has a carbon residue of at least 5 percent by weight, and the reaction products formed by the addition to said oil of a sulphonating agent for said asphaltene constituent of said oil in an amount equivalent to between about 1.8 and 6.0 pounds of available sulphur trioxide per barrel of said oil and by the addition thereafter to said oil at a temperature between about 115° and 120° F. of a compound selected from the group consisting of a silicate and an aluminate of an alkali metal in an amount of at least half that required to react stoichiometrically with the reaction product of said asphaltene constituent with said sulphonating agent, said drill fluid containing not more than 4 percent by weight of water.

4. A full oil phase drilling fluid comprising a predominant amount of petroleum oil, which oil contains an asphaltene constituent and has a carbon residue of at least 5 percent by weight, and the reaction products including a compound selected from the group consisting of silicon dioxide and aluminum oxide formed by the addition to said oil of a sulphonating agent for said asphaltene constituent of said oil in an amount equivalent to between 1.8 and 6.0 pounds of available sulphur trioxide per barrel of said oil and by the addition thereafter to said oil of a compound selected from the group consisting of a silicate and an aluminate of an alkali metal in an amount of at least half that required to react stoichiometrically with the reaction product of said asphaltene constituent with said sulphonating agent, said drilling fluid containing not more than 4 percent by weight of water.

5. A full oil phase drilling fluid comprising a predominant amount of petroleum oil, which oil contains an asphaltene constituent and has a carbon residue of at least 5 percent by weight, and the reaction products formed by the addition to said oil of a sulphonating agent for said asphaltene constituent of said oil in an amount equivalent to between about 1.8 and 6.0 pounds of available sulphur trioxide per barrel of said oil and by the addition thereafter to said oil of a silicate and an aluminate of an alkali metal in a total amount of at least half that required to react stoichiometrically with the reaction product of said asphaltene constituent with said sulphonating agent, said drilling fluid containing not more than 4 percent by weight of water.

6. A full oil phase drilling fluid comprising a predominant amount of petroleum oil, which oil contains an asphaltene constituent and has a carbon residue of at least 5 percent by weight, and the reaction products formed by the addition to said oil of a sulphonating agent for said asphaltene constituent of said oil in an amount equivalent to between about 1.8 and 6.0 pounds of available sulphur trioxide per barrel of said oil, by the addition thereafter to said oil of a compound selected from the group consisting of a silicate and an aluminate of an alkali metal in an amount of at least half that required to react stoichiometrically with the reaction product of said asphaltene constituent with said sulphonating agent, and by the addition subsequently to said oil of a compound selected from the group consisting of the salts, oxide, and hydroxide of an alkaline earth metal in an amount equal to that required to react stoichiometrically with the reaction product of said asphaltene constituent with said sulphonating agent with said compound selected from the group consisting of a silicate and an aluminate of an alkali metal, said drilling fluid containing not more than 4 percent by weight of water.

7. A full oil phase drilling fluid comprising a predominant amount of petroleum oil, which oil contains an asphaltene constituent and has a carbon residue of at least 5 percent by weight, and the reaction products formed by the addition to said oil of a sulphonating agent for said asphaltene constituent of said oil in an amount equivalent to between about 1.8 and 6.0 pounds of available sulphur trioxide per barrel of said oil, by the addition thereafter to said oil of a silicate and an aluminate of an alkali metal in a total amount of at least half that required to react stoichiometrically with the reaction product of said asphaltene constituent with said sulphonating agent, and by the addition subsequently to said oil of a compound selectetd from the salts, oxide, and hydroxide of an alkaline earth metal in an amount equal to that required to react stoichiometrically with the reaction products of said asphaltene constituent with said sulphonating agent with said silicate and said aluminate of an alkali metal, said drilling fluid containing not more than 4 percent by weight of water.

8. A process for preparing a full oil phase drilling fluid comprising adding to petroleum oil containing an asphaltene constituent and having a carbon residue of at least 5 percent by weight a sulphonating agent for said asphaltene constituent of said oil in an amount equivalent to between about 1.8 and 6.0 pounds of available sulphur trioxide per barrel of said oil to form within said oil a reaction product of said asphaltene constituent with said sulphonating agent, and thereafter adding to said oil a compound selected from the group consisting of a silicate and an aluminate of an alkali metal in an amount of at least half that required to react stoichiometrically with said reaction product of said asphaltene constituent with said sulphonating agent, said drilling fluid containing not more than 4 percent by weight of water.

9. The process of claim 8 wherein said sulphonating agent is concentrated sulphuric acid.

10. The process of claim 8 wherein said compound selected from the group consisting of a silicate and an aluminate of an alkali metal is reacted with said reaction product of said asphaltene constituent with said sulphonating agent at a temperature between about 115° and 120° F.

11. A process for preparing a full oil phase drilling fluid comprising adding to petroleum oil containing an asphaltene constituent and having a carbon residue of at least 5 percent by weight a sulphonating agent for said asphaltene constituent of said oil in an amount equivalent to between about 1.8 and 6.0 pounds of available sulphur trioxide per barrel of said oil to form within said oil a reaction product of said asphaltene constituent with said sulphonating agent, and thereafter adding to said oil a silicate and an aluminate of an alkali metal in a total amount of at least half that required to react stoichiometrically with said reaction product of said asphaltene constituent with said sulphonating agent, said drilling fluid containing not more than 4 percent by weight of water.

12. A process for preparing a full oil phase drilling fluid comprising adding to petroleum oil containing an asphaltene constituent and having a carbon residue of at least 5 percent by weight a sulphonating agent for said asphaltene constituent of said oil in an amount equivalent to between about 1.8 and 6.0 pounds of available sulphur trioxide per barrel of said oil to form within said oil a reaction product of said asphaltene constituent with said sulphonating agent, thereafter adding to said oil a compound selected from the group consisting of a silicate and an aluminate of an alkali metal in an amount of at least half that required to react stoichiometrically with said reaction product of said asphaltene constituent with said sulphonating agent, and thereafter adding to said oil a compound selected from the group consisting of the salts, oxide, and hydroxide of an alkaline earth metal in an amount equal to that required to react stoichiometrically with the reaction product of said asphaltene constituent with said sulphonating agent with said compound selected from the group consisting of a silicate and an aluminate of an alkali metal, said drilling fluid containing not more than 4 percent by weight of water.

13. The process of claim 12 wherein said sulphonating agent is concentrated sulphuric acid.

14. A process for preparing a full oil phase drilling fluid comprising adding to petroleum oil containing an asphaltene constituent and having a carbon residue of at least 5 percent by weight a sulphonating agent for said asphaltene constituent of said oil in an amount equivalent to between about 1.8 and 6.0 pounds of available sulphur trioxide per barrel of said oil to form within said oil a reaction product of said asphaltene constituent with said sulphonating agent, thereafter adding to said oil a silicate and an aluminate of an alkali metal in a total amount of at least half that required to react stoichiometrically with said reaction product of said asphaltene constituent with said sulphonating agent, and thereafter adding to said oil a compound selected from the salts, oxide, and hydroxide of an alkaline earth metal in an amount equal to that required to react stoichiometrically with the reaction products of said asphaltene constituent with said sulphonating agent with said silicate and said aluminate of an alkali metal, said drilling fluid containing not more than 4 percent by weight of water.

References Cited by the Examiner

UNITED STATES PATENTS

| | | | |
|---|---|---|---|
| 2,348,609 | 5/44 | Cohen | 260—504 |
| 2,461,483 | 2/49 | Self | 252—8.5 |
| 2,555,794 | 6/51 | Henkes | 252—8.5 |
| 2,779,735 | 1/57 | Brown et al. | 252—8.55 |
| 2,798,851 | 7/57 | Nelson | 252—8.5 |
| 2,953,525 | 9/60 | Young | 252—8.5 |
| 2,988,505 | 1/61 | Oakes | 252—8.55 |
| 3,028,333 | 4/62 | Stratton et al. | 22—8.5 |

JULIUS GREENWALD, *Primary Examiner.*